April 24, 1956     L. V. NIGRO     2,742,693
MAGAZINE SAFETY RAZOR

Filed Oct. 18, 1952     5 Sheets-Sheet 1

April 24, 1956 L. V. NIGRO 2,742,693
MAGAZINE SAFETY RAZOR

Filed Oct. 18, 1952 5 Sheets-Sheet 3

Inventor.
Louis V. Nigro
By H. W. Kenway, Atty.

April 24, 1956 L. V. NIGRO 2,742,693
MAGAZINE SAFETY RAZOR
Filed Oct. 18, 1952 5 Sheets-Sheet 4

April 24, 1956 L. V. NIGRO 2,742,693
MAGAZINE SAFETY RAZOR
Filed Oct. 18, 1952 5 Sheets-Sheet 5

Inventor.
Louis V. Nigro
by H.W. Kenway atty.

United States Patent Office 2,742,693
Patented Apr. 24, 1956

2,742,693

MAGAZINE SAFETY RAZOR

Louis V. Nigro, Chelsea, Mass., assignor to The Gillette Company, Boston, Mass., a corporation of Delaware Application October 18, 1952, Serial No. 315,473

21 Claims. (Cl. 30—40)

This invention comprises a new and improved safety razor of the magazine type, so organized that by a single complete reciprocation or oscillation of a feed slide, the used blade is ejected and a fresh sharp blade presented in operative shaving position without danger of jamming.

In razors of this general type as heretofore constructed, these operations usually require two complete reciprocations of a feed slide, or invite jamming of the blades at the exit slot if for any reason the normal feeding operation is interrupted. In the improved razor of my invention, these operations may be conveniently carried out in less time than formerly required, and with mechanism which is more simple and sturdy than heretofore known.

An important feature of the invention consists in a feed slide having blade-engaging faces disposed at two different levels and located to engage respectively at the same time and at different levels the blade in operative shaving position and the next underlying blade in the magazine. As herein shown, the portion of the feed slide at one level is utilized to hold the operative blade in contact with blade stops of limited height, while the portion of the feed slide located at a different level is utilized to hold the blades in the magazine out of blade-feeding path. Accordingly, when the feed slide is moved in one direction, the used blade is permitted to rise and clear the blade stops, and at the same time, the uppermost blade in the magazine is permitted to rise into the blade-feeding path. Therefore in the movement of the feed slide in the other direction the used blade is ejected and simultaneously a new blade is advanced to shaving position.

Another feature of the invention consists in a feed slide having an inclined or beveled portion arranged to act during the feeding operation to rock or tilt the blade stack so as to insure at all times the free movement thereof required to bring successive blades into the blade-feeding path.

Another feature of the invention comprises a detachable and removable magazine containing a stack of blades arranged to be supplied to the feed slide as above suggested, the magazine having an open top and being shaped to cooperate with the razor head in separating and feeding individual blades from the stack. As herein shown the magazine has overhanging blade-retaining sections which not only hold the blades against accidental displacement in the magazine but act as blade-arresting stops in the feeding operation and so contribute to the accurate and dependable operations of the razor.

Still another feature of the invention consists of a removable magazine having formed therein the lower guard member of the razor. Such a magazine supplies an essential element of the razor which as thus assembled in fresh undamaged condition with each new magazine so that the razor is repeatedly renewed in an element that is likely to become damaged by dropping in razors heretofore available.

Further, the magazine may be so constructed that the blade stack is not subjected to spring pressure until it is actually assembled as a part of the safety razor. This makes it possible to utilize plastic resins in the construction of the magazine which would otherwise be deformed in slow flow if maintained under distorting pressure while in storage and transportation.

These and other features of the invention will be best understood and appreciated from the following description of preferred embodiments thereof selected for purposes of illustration and shown in the accompanying drawings in which.

Figure 1:
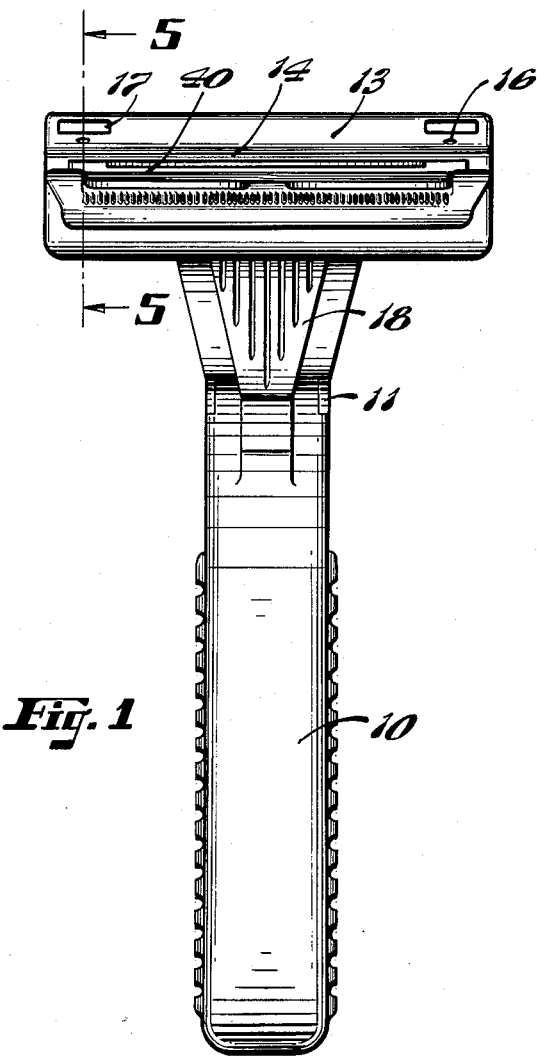
Fig. 1 is a view in front elevation of a complete safety razor embodying the invention.

The razor shown in Fig. 1 includes in its structure an elongated handle 10 which may be of light metal or molded plastic resin and may be provided at opposite sides with corrugations to facilitate grasping the razor. Secured to the upper end of the handle is a metallic head having a sheet metal shank 11 which is channel-shaped in cross section to fit the upper end of the handle 10. The head includes also a back plate 12 which merges into a forward and downwardly inclined top or cover plate 13. The top plate 13 is shaped to provide the upper guard member 14 of the razor, and from its under face projects a pair of shallow circular bosses 15 having flat downwardly directed surfaces. Preferably, these bosses are formed by molding or swaging the material of the cover plate, and their location is indicated by depressions 16 in the upper surface of the plate. The plate 13 is also provided with a pair of rectangular apertures 17 one located adjacent to each of its rear corners for the reception of correspondingly spaced projections on the magazine as will presently appear. At each end the cover plate has a down-turned end flange for positioning the magazine centrally beneath it.

The blade magazine, which is rectangular in cross section, is retained in position against the back plate 12, beneath the cover plate 13 and between the end flanges by a clamp 18 which is pivotally mounted in the upper end of the handle 10. The clamp is provided with a bore to receive a spring 19 normally pressing the clamp rearwardly toward the shank 11 and into engagement with the magazine while permitting the clamp to be forcibly rocked outwardly by the user to release the magazine.

Figure 2:
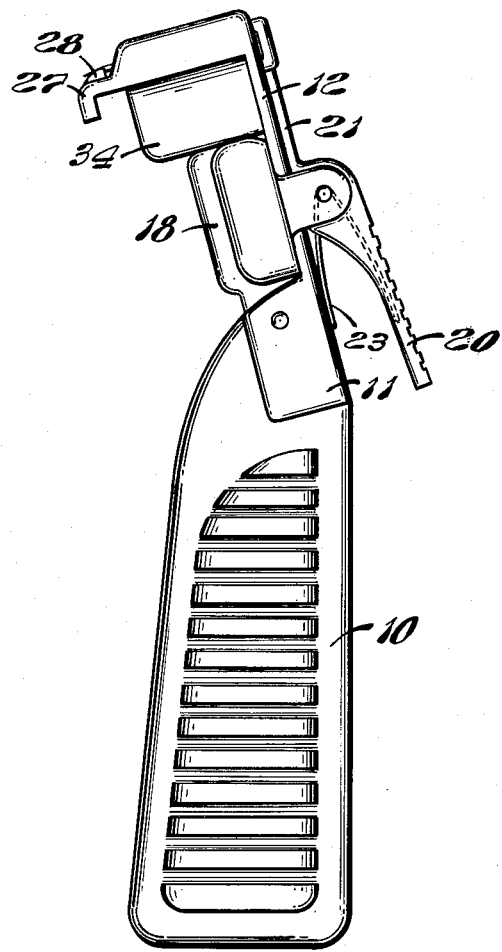
Fig. 2 is a corresponding view in side elevation.
Figure 10:
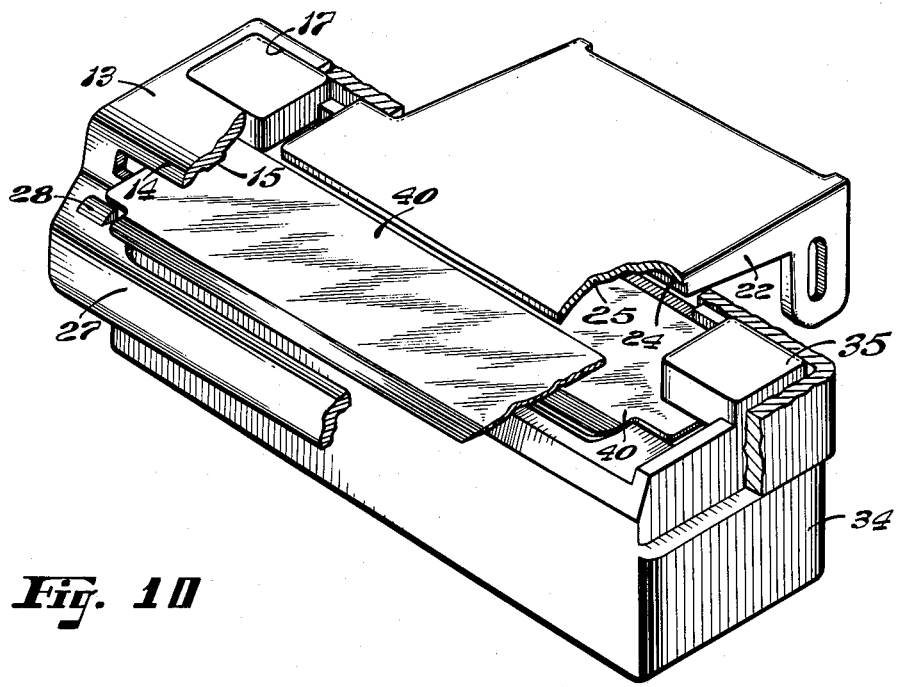
Fig. 10 is a view in perspective of the magazine and feed slide shown on a greatly enlarged scale.

The blade feeding mechanism of the razor includes a lever having a thumb-operated arm 20 and being pivotally mounted between lugs extending rearwardly from the shank 11. The upper arm 21 of the lever is pivotally connected to a feed slide 22. A torsion spring 23 tends always to rock the lever 20—21 in a counterclockwise direction as shown in Fig. 2 and so to move forwardly and hold the feed slide at the inward limit of its stroke. The pivotal connection of the feed slide with the lever arm 21 is made through vertical slots in downwardly projecting arms of the feed slide so as to permit the necessary lost motion of the slide with respect to the lever arm in the full transverse motion of the slide. The rear portion of the feed slide comprises a relatively thick forwardly tapering land which is limited at its forward edge by an abrupt transverse feed shoulder 24. Beyond the shoulder 24 this slide extends forwardly in a section 25 which is relatively thin and of uniform thickness. The thin section 25 is extended transversely at both sides into oppositely disposed ears as shown in Fig. 10. It will be seen that the lower face of the rear portion of the feed slide is, therefore, located at a lower level than the lower face of the thin section 25.

The cover plate 14 is extended downwardly and forwardly at its front edge and shaped to provide an edge surface 27 constituting the lower guard element, this being separated from the upper edge guard surface 14 by a slot through which the blade projects when in shaving position as indicated in Fig. 10. The lower guard is provided at each end with an upwardly projecting lug 28 having a rearwardly directed upright surface which acts as a positive blade stop.

Figure 9:
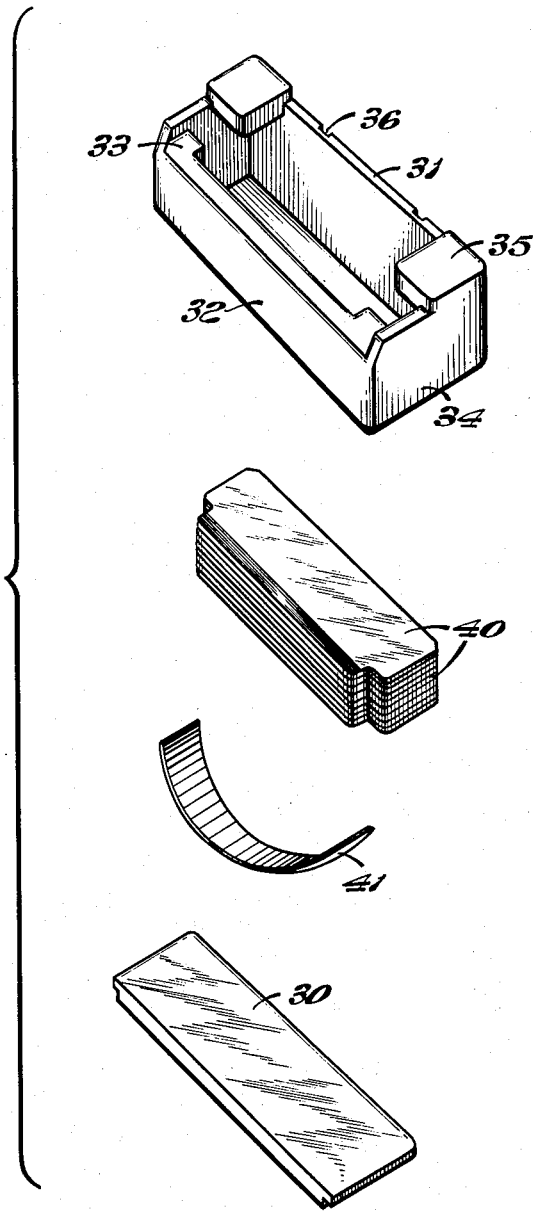
Fig. 9 is a view in perspective showing the parts of the magazine in exploded relation.

The razor above-described is equipped with a rectangular magazine illustrated in detail in Fig. 9. Any suitable material may be employed for this unit but preferably and as herein shown, it is molded out of synthetic resin and includes a rectangular bottom plate 30 provided at each end with undercut ribs and these are adapted to be snapped into corresponding slots in the body of the magazine. This includes a rear wall 31, a front wall 32, provided internally with vertical blade-locating ribs 33, and end walls 34. The end walls merge into overhanging rectangular blade-retaining sections 35, which are adapted to fill the apertures 17 already mentioned as provided in the cover plate 13 of the razor head. The sections 35 are thicker than the cover plate 14 and project below its under surface so that their forward edges act as stops to prevent retraction of the uppermost blade should it tend to drag back with the feed slide. Notches 36 may be provided in the rear wall 31 to receive portions of the feed slide connection such as the downwardly extending arms of the slide.

The magazine is shaped to contain a stack of twelve to twenty single-edged blades 40 provided with unsharpened corner notches accurately located with respect to the cutting edge of the blade and designed to cooperate with the blade stops 28 in determining with extreme accuracy the operative or shaving position of the blade with respect to the upper and lower edge guard surfaces 14 and 27. A bowed leaf spring 41 may be placed in the magazine beneath the blade stack, and this spring tends at all times to elevate the blade stack and hold the uppermost blade in contact either with the thick tapering land 22 of the feed slide or with the thin flat section 25 according to the position of the slide.

Figure 4:
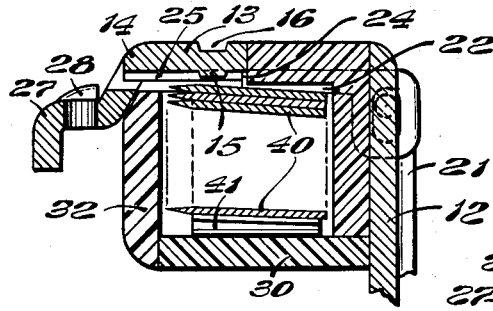
Figs. 4–8 are views in cross section on the line 5—5 of Fig. 1 showing progressive positions of the feed slide and blades.

The initial position of the blade stack in the magazine is shown in Fig. 4 from which it will be noted that the blades of the stack are tilted slightly toward the rear by reason of the rearward inclination of the land 22 of the feed slide. In this figure the feed slide is shown in its normal initial or inward position, that is to say, fully advanced by the spring 23.

When it is desired to present a blade in shaving position, the thumb-operated arm 20 of the feed lever is depressed by the user and then released. When the arm is depressed, the feed slide is moved rearwardly to the predetermined position shown in Fig. 5. In this position the thick tapering land 22 of the slide is withdrawn entirely out of range of the blade stack and the blade stack is thereupon moved upwardly by the spring 41 into contact with the flat thin section 25 of the feed slide and is slightly rocked out of its initial inclined position shown in Fig. 4. The uppermost blade now occupies its feeding position in line with the shoulder 24 of the feed slide and lies flat against the flat section 25.

Figure 5:
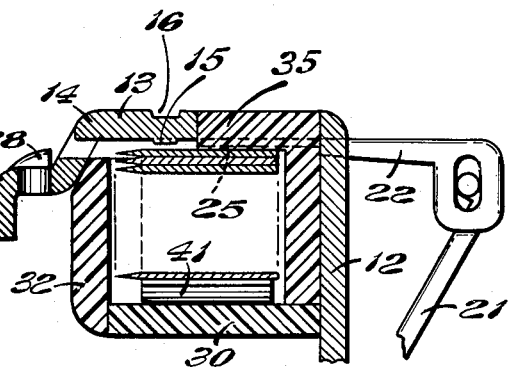
Figure 6:
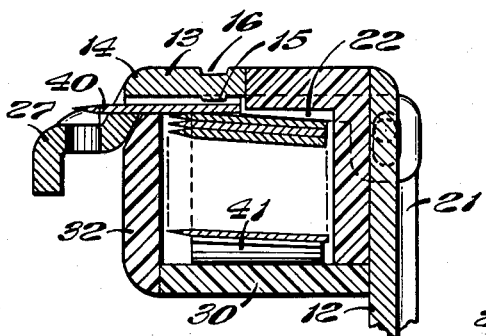

When the thumb-operated arm 20 is released, the feed slide is moved by the spring 23 forwardly from the position shown in Fig. 5 to the position shown in Fig. 6 and in this movement, the uppermost blade 40 is advanced by the feed shoulder 24 over the forward edge of the front wall 32 of the magazine, through the passage between the upper and lower guard members and into contact with the rearwardly directed upright faces of the stop lugs 28. Meanwhile, the thick land of the feed slide 22 engages the blade which has now become uppermost in the stack by the forward movement of the previous blade and the blades of the stack are again slightly depressed and tilted or rocked into the inclined position shown in Fig. 6.

It will be noted that the operative blade is held firmly with its unsharpened notch shoulders against the flat vertical faces of the stop lugs 28 by pressure of the spring 23 acting through the shoulder 24 of the feed slide. After using the blade for shaving in the position shown in Fig. 6, the used blade may be ejected and replaced by a fresh blade merely by again depressing and then releasing the thumb arm 21 of the feed lever. In the ejecting movement the used blade first rises into the space just vacated by the flat section 25 and the bosses 15, which it will be noted are located opposite the open side of the magazine, prevent the used blade from tilting. Were it not for the bosses 15 the sharp edge of the blade might dip and catch on the blade stop lugs 28. It will be noted that the fresh blade is moved less than its width in the feeding step and that its rear portion is supported in shaving position by the stack. This cycle of operations permits in practice the employment of compact razor construction.

Figure 7:
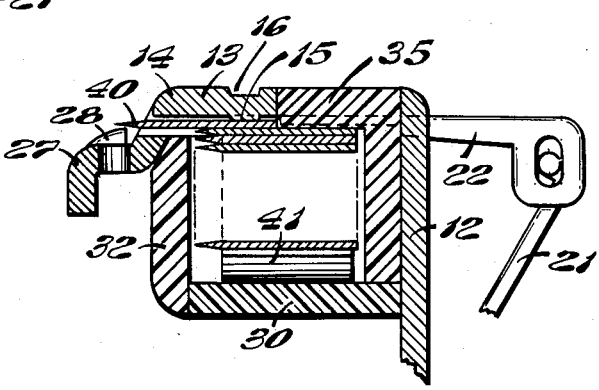

Fig. 7 represents the feed slide again moved to its fully retracted position. This movement has withdrawn the thin outer portion of the slide from above the operative blade and permitted the upward pressure of the spring 41 to lift the blade into contact with the bosses 15 and thereby to clear it from the stop lugs 28. Rearward drag of this blade has been positively prevented by the forward edges of the magazine corner sections 35 and the blade is now located with its rear edge in advance of the forward edge of the thin portion 25 of the feed slide. At the same time the next underlying blade in the stack has been lifted in contact with the underface of the thin outer portion of the slide.

Figure 8:
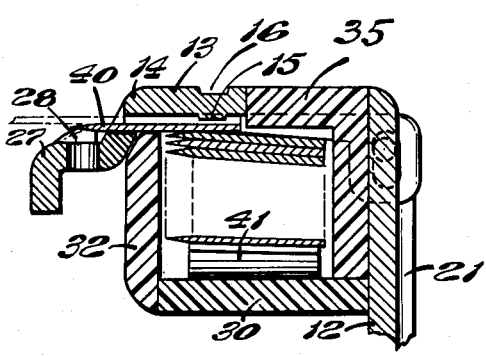

Fig. 8 represents the feed slide as again moved to its fully advanced position. In this movement the used blade formerly in shaving position has been ejected by the advancing forward edge of the thin portion 25 of the feed slide, the next blade in the stack has been advanced by the feed shoulder 24 until arrested in shaving position against the fixed stop lugs 28. The tapered land 22 has also caused the blades of the stack to rock into their slightly tilted condition. This periodic rocking of the blades, while located by the ribs 33 of the magazine, insures free upward movement of the blades under the pressure of the spring 41 and eliminates all danger of binding in the magazine.

It will be apparent, therefore, from an inspection of Figs. 4–8 that the user has only to depress and release the thumb-operated arm 20 in order to eject from the razor the used blade and replace it in operative shaving position by a fresh sharp blade from the magazine.

Figure 11:
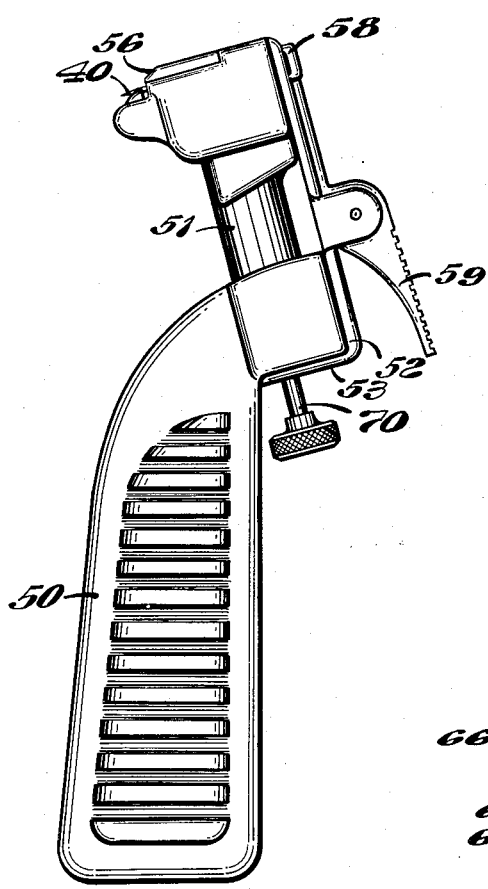
Fig. 11 is a view in side elevation of a safety razor constituting a second embodiment of the invention.
Figure 12:
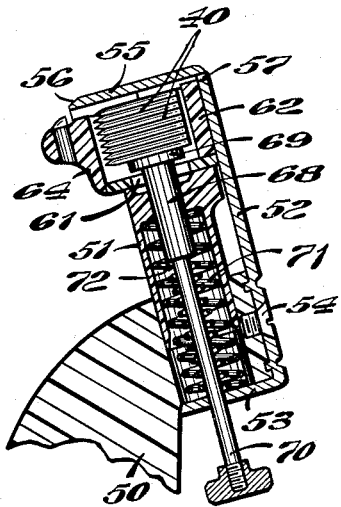
Fig. 12 is a corresponding view in side elevation.
Figure 13:
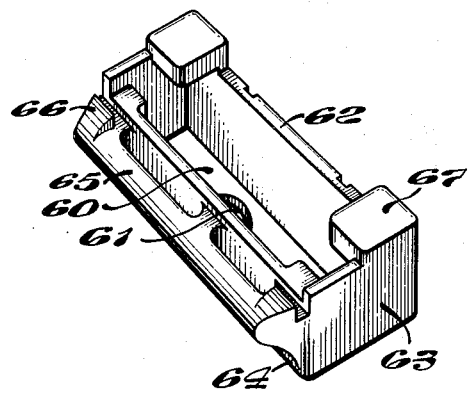
Fig. 13 is a view in perspective of the magazine employed with the razor of Figs. 11 and 12.

In Figs. 11–13 is illustrated a modified razor and magazine construction possessing all the advantages above-described as well as other desirable characteristics. The razor therein shown comprises a handle 50, offset at its upper end and provided with a cylinder bore to receive the tubular shank 51 of the razor head. The head comprises a back plate 52 having an inturned bottom flange 53 shaped to engage the bottom of the offset end of the handle. The head is secured to the handle by a screw 54 and ribs formed in the back plate 52 which interlock with corresponding grooves of the handle. The back plate merges at its upper end in a forwardly inclined top plate 55 of which the front edge is shaped to serve as the upper guard member of the razor. End flanges are provided at the ends of the top plate for engaging the magazine.

The back plate 52 is provided with a slit 57 which is located below the top plate to receive the feed slide 58. This is similar to the feed slide of Figs. 4–8 and is operated by a lever 59 pivotally mounted upon lugs projecting rearwardly from the back plate and normally biased towards its forward position by a torsion spring not shown. The feed slide and its operating lever are omitted from Fig. 12.

The magazine employed in the razor of Figs. 11 and 12 may be molded of plastic resin and is similar to that described in connection with Fig. 9 except that it has as an integral part of its front wall the lower guard member of the razor and this acts in cooperation with the upper guard member 56 in determining the edge exposure of the operative blade.

The magazine as shown in Fig. 13 comprises a bottom plate 60 having a circular aperture 61 therein, a rear wall 62, end walls 63 and a front wall 64. The front wall merges forwardly into the lower guard member 65 of the razor, and this is partially separated from the front wall by longitudinal slots. The guard member 65 is provided at each end with a blade stop lug 66. These lugs are of limited height and each of them presents a vertical inner face accurately located to engage unsharpened edge faces formed by the notches at the ends of the sharpened edge of the blade. The magazine is also provided with rectangular overhead retaining sections 67 corresponding in shape and function to the sections 35 of the magazine shown in Fig. 9.

The head of the razor is provided with a plunger 68 having a circular head which is freely movable through the aperture 61 in the bottom of the magazine. The plunger is provided with a downwardly-extending stem 70 provided with an operating knob, and it is surrounded by a compression spring 71 received in a bore surround the plunger and bearing in its lower end upon the inner face of the bottom flange 53 of the head, thus always pressing the tubular stem 51 upwardly into clamping engagement with the bottom plate 60 of the magazine, and so clamping the magazine in position against the top plate 55 and the back plate 52.

Figure 3:
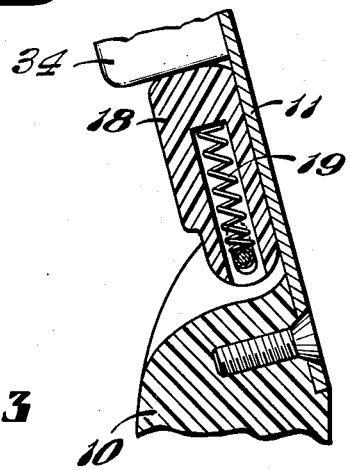
Fig. 3 is a fragmentary view in longitudinal section showing particularly the clamp for holding the magazine in place.

The stem 70 of the plunger is surrounded by a compression spring 72 by which the plunger itself is urged upwardly against the lowermost blade 40 of the blade stack in the magazine. That is to say, in this construction the spring 72 performs the function of the leaf spring 41 of Figs. 4–7. The spindle 70, moreover, is thus effective in carrying out both the function of the spring 41 and of the clamp 18 of Fig. 3 in clamping the magazine in its operative position or releasing it for removal. It will be further observed that since the plunger 68 is effective only when the magazine is inserted in the razor head, the magazine is entirely free of spring stress while in storage of distribution.

It will be noted that the magazine of Fig. 13 includes in its structure not only the lower guard member which is renewed with each fresh magazine but also blade stops 66, stops 67 preventing retraction of the blades, and the stripper edge in the front wall of the magazine which insures the feed of a single blade only from the stack. All of these elements are renewed in the razor with each new magazine and so kept sharp and accurate in their functions.

Having thus disclosed my invention and described in detail an illustrative embodiment thereof, I claim as new and desire to secure by Letters Patent:

1. A magazine razor comprising a head having a stationary cover portion carrying upper and lower guard surfaces separated by a blade passage, rigid blade-arresting stops associated with the lower guard surface, a rectangular blade magazine having a partially open top and being held in position beneath said cover portion, a stack of blades in the magazine and a spring urging the blade stack upwardly, a reciprocatory plate movable between the cover portion and the uppermost blade of the stack and having relatively thick inner blade-depressing land separated by a blade-feeding shoulder from an outer portion of reduced thickness thus forming a step in the inner face of said plate, whereby in the rearward movement of said plate the uppermost blade of the stack is released to move upwardly into contact with the thinner outer portion of said plate and in the forward movement of said plate the released blade is advanced into contact with the said blade-arresting stops.

2. A magazine razor as described in claim 1 in which the under face of the stationary cover portion is provided with a downwardly-extending projection opposite the open top of the magazine.

3. A magazine razor as described in claim 1 in which the under face of the stationary cover portion is provided with downwardly-extending bosses disposed transversely in advance of the blade-feeding shoulder of the said reciprocating plate and out of line therewith.

4. A magazine razor as described in claim 1 in which the under face of the blade-depressing land is inclined and, in cooperation with said spring, acts to move the blade stack up and down in each complete reciprocation.

5. A magazine razor comprising a head with a stationary cover plate, an open top magazine located beneath said coved plate and having a blade stack therein, a feed slide having a thin outer portion separated from a thick inner portion by a blade-feeding shoulder, and spring means urging the blade stack toward the feed slide, the feed slide being mounted for movement from a position in which its thin portion overlies a blade engaged by the said feeding shoulder to a position in which the rear edge of the said blade is engaged by the outer edge only of the thin outer portion of the slide.

6. A magazine razor as described in claim 5 in which the stationary cover plate of the head is provided with downward projections located to engage the uppermost blade when the feed slide is retracted from above the blade.

7. A magazine razor as described in claim 5 in which the magazine contains downwardly projecting stop members located to engage the rear edge of a blade while the feed slide is being retracted to prevent rearward drag of the blade.

8. A magazine razor comprising a head having guard edges and spaced blade stops, an open top magazine containing a stack of upwardly pressed blades, and a reciprocatory feed slide having a flat front portion shaped to hold an operative blade down in engagement with the blade stops while permitting it to be elevated above the said stops when the slide is retracted and having a blade-ejecting edge shaped to eject a blade from its elevated position by passing it above the blade stops.

9. A magazine razor operative to eject a used blade and replace it by a fresh blade in a single reciprocation of a feed slide; the razor comprising a head having spaced fixed blade stops of limited height and containing a stack of upwardly pressed blades, and a feed slide mounted to reciprocate above the blade stack, having an outer flat portion normally holding an operative blade down in contact with said blade stops and a blade-feeding shoulder defining the rear edge of the flat portion and movable with the slide to advance a fresh blade from the stack at the same time the used blade is ejected.

10. A magazine razor as described in claim 9 in which means are provided for holding the used blade from tilting when it is elevated above the level of the blade stops.

11. A magazine razor as described in claim 9 in which the lower face of the feed slide has blade-positioning surfaces disposed at two levels and located to engage and overlie respectively, at the same time and at different levels, the blade in operative shaving position and the next underlying blade in the stack.

12. A safety razor of the magazine type comprising a handle, a head attached to the handle and having an overhanging top plate with a guard edge thereon, an open top magazine containing a stack of blades, a pivoted clamp carried by the handle for removably clamping the magazine against the top plate of the head, and means for advancing the uppermost blade of the stack into shaving relation with the guard edge of the top plate.

13. A safety razor comprising a handle, a head carried by the handle and having an upper guard member therein, a rectangular open top magazine having a stack of blades therein and presenting as a part thereof a lower guard member, and means for removably clamping the magazine in the razor head with the lower guard member of the magazine operatively related to the upper guard member of the head.

14. A safety razor comprising a handle, a head carried thereby and having an overhanging top plate presenting an upper guard member, an open top magazine containing a stack of blades, and spring operated means in said head for both clamping the magazine upwardly against the top plate and for urging the blade stack in the same direction.

15. A safety razor comprising a handle and a head with a cover plate and an opposed flange, an open-top magazine having a perforated bottom and containing a stack of blades, and spring operated means supported by said flange for both clamping the magazine against the cover plate and pressing the blade stack toward said plate.

16. A safety razor as described in claim 15 in which the spring operated means comprises a tubular stem, a concentrically disposed plunger and concentric springs engaging respectively the stem and plunger.

17. A safety razor comprising a head having a cover plate with an upper guard member and spaced apertures, in combination with an open-top magazine having a cooperating lower guard member and overhanging blade-retaining sections fitting the apertures of the cover plate and projected below the same as blade-arresting stops.

18. A safety razor comprising a handle and head having the upper guard member of the razor formed as a part thereof, in combination with a detachable and removable magazine having the lower guard member of the razor formed as a part thereof, and means for clamping the magazine in the razor with the two guard members in definite fixed relation.

19. A safety razor comprising a head having an upper guard member and blade-feeding means, in combination with a removable and replaceable magazine having stationary blade stops cooperating with the feeding means of the head for arresting a blade advanced by the feeding means and locating it in shaving position.

20. A safety razor comprising a head having a guard member and blade-feeding means, in combination with a removable and replaceable magazine having a sharp stripper edge for limiting the action of the said feeding means to a single blade, spaced blade stops and a cooperating guard member all located in predetermined relation to the guard member of the razor head and renewable in the razor with each new magazine.

21. A safety razor as defined in claim 20 in which the replaceable magazine has also spaced overhanging and downwardly projecting stops for preventing retraction of a blade by the feeding means.

References Cited in the file of this patent

UNITED STATES PATENTS

| | | |
|---|---|---|
| 1,999,129 | Minnelli | Apr. 23, 1935 |
| 2,304,314 | Muros | Dec. 8, 1942 |
| 2,309,780 | Muros | Feb. 2, 1943 |
| 2,334,833 | Muros et al. | Nov. 23, 1943 |
| 2,510,951 | Bleeker et al. | June 13, 1950 |
| 2,576,588 | Gabriel | Nov. 27, 1951 |
| 2,587,625 | Jones et al. | Mar. 4, 1952 |